(12) United States Patent
Belghoul et al.

(10) Patent No.: US 10,517,042 B2
(45) Date of Patent: Dec. 24, 2019

(54) CMAS ALERT PROCEDURES OVER WI-FI FOR LOW POWER DEVICES

(71) Applicant: Apple Inc., Cupertino, CA (US)

(72) Inventors: Farouk Belghoul, Campbell, CA (US); Rafael L. Rivera-Barreto, Santa Clara, CA (US); Krisztian Kiss, Hayward, CA (US); Rohan C. Malthankar, San Jose, CA (US); Tarik Tabet, Los Gatos, CA (US); Cesar Perez, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 15/380,175

(22) Filed: Dec. 15, 2016

(65) Prior Publication Data

US 2017/0171814 A1    Jun. 15, 2017

Related U.S. Application Data

(60) Provisional application No. 62/267,815, filed on Dec. 15, 2015.

(51) Int. Cl.
*H04W 52/02* (2009.01)
*H04W 4/14* (2009.01)
*H04L 29/06* (2006.01)
*H04W 4/90* (2018.01)
*H04W 84/12* (2009.01)
*H04W 88/06* (2009.01)
*H04L 29/08* (2006.01)

(52) U.S. Cl.
CPC ..... *H04W 52/0212* (2013.01); *H04L 65/1006* (2013.01); *H04L 65/1016* (2013.01); *H04L 65/1073* (2013.01); *H04W 4/14* (2013.01); *H04W 4/90* (2018.02); *H04W 52/0229* (2013.01); *H04L 65/1033* (2013.01); *H04L 67/26* (2013.01); *H04W 84/12* (2013.01); *H04W 88/06* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/168* (2018.01); *Y02D 70/26* (2018.01)

(58) Field of Classification Search
CPC ............... H04W 52/0212; H04W 4/90; H04W 52/0229; H04W 4/14; H04W 88/06; H04W 84/12; H04L 65/1006
USPC ........................... 370/311; 455/404.2, 412.2
See application file for complete search history.

(56) References Cited

U.S. PATENT DOCUMENTS

| 8,200,183 B2 | 6/2012 | Aftelak et al. | |
| 8,825,092 B2 | 9/2014 | Sennett et al. | |
| 2009/0227224 A1* | 9/2009 | Aftelak | H04M 11/04 455/404.2 |
| 2009/0247111 A1* | 10/2009 | Sennett | H04W 4/90 455/404.1 |

(Continued)

*Primary Examiner* — Kwang B Yao
*Assistant Examiner* — Syed M Bokhari
(74) *Attorney, Agent, or Firm* — Kowert Hood Munyon Rankin and Goetzel PC; Jeffrey C. Hood

(57) ABSTRACT

Distributing indications of emergency messages via Wi-Fi. A cellular device may temporarily disable its cellular modem. The cellular device may receive an indication over Wi-Fi that an emergency message has been broadcast. In response, the cellular device may activate its cellular modem and retrieve the emergency message via a cellular network.

19 Claims, 14 Drawing Sheets

(56) References Cited

U.S. PATENT DOCUMENTS

| | | | |
|---|---|---|---|
| 2009/0291670 A1* | 11/2009 | Sennett | H04M 3/53375 455/412.2 |
| 2012/0327837 A1 | 12/2012 | Harrington et al. | |
| 2013/0339438 A1* | 12/2013 | Cherian | H04W 4/005 709/204 |
| 2014/0269465 A1* | 9/2014 | Ballantyne | H04W 4/06 370/311 |
| 2014/0273910 A1* | 9/2014 | Ballantyne | H04W 4/90 455/404.1 |

* cited by examiner

```
-- ASN1START

Paging ::=                  SEQUENCE {
    pagingRecordList            PagingRecordList        OPTIONAL,   -- Need ON
    systemInfomodification      ENUMERATED {true}       OPTIONAL,   -- Need ON
    etws-Indication             ENUMERATED {true}       OPTIONAL,   -- Need ON
    nonCriticalExtension        Paging-v890-IEs         OPTIONAL
}

Paging-v890-IEs ::=         SEQUENCE {
    lateNonCriticalExtension    OCTET STRING            OPTIONAL,
    nonCriticalExtension        Paging-v920-IEs         OPTIONAL
}

Paging-v920-IEs ::=         SEQUENCE {
    cmas-Indication-r9          ENUMERATED {true}       OPTIONAL,   -- Need ON
    nonCriticalExtension        Paging-v1130-IEs        OPTIONAL
}
```

*Paging Message*

*FIG. 7*

CMAS ALERT PROCEDURES OVER WI-FI FOR LOW POWER DEVICES

PRIORITY CLAIM

The present application claims benefit of priority to Application No. 62/267,815 titled CMAS Alert Procedures over Wi-Fi for Low Power Devices filed on Dec. 15, 2015, whose inventors are Farouk Belghoul, Rafael L. Rivera-Barreto, Krisztian Kiss, Rohan C. Malthankar, Tank Tabet, and Cesar Perez, which is hereby incorporated by reference as though fully and completely set forth herein.

FIELD

The present disclosure relates to wireless devices, and more particularly to a system and method for distributing commercial mobile alert system (CMAS) alerts to a device over Wi-Fi.

DESCRIPTION OF THE RELATED ART

Wireless communication systems are rapidly growing in usage. Further, wireless communication technology has evolved from voice-only communications to also include the transmission of data, such as Internet and multimedia content.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers. Accordingly, it is common for at least some wireless devices to communicate using multiple wireless technologies or standards. For example, some wireless devices (such as some smart phones, etc.), may be capable of cellular communication as well as Wi-Fi communication. Furthermore, to save power, one or more of these wireless communication technologies may be turned off in order to save energy. For example, the cellular modem of a wireless device may be switched off when the device is attached to the internet protocol (IP) Multimedia Subsystem (IMS) network via Wi-Fi.

In many countries, emergency alert systems are used to provide various notifications to the public, such as notifications of severe weather events (tornadoes, flash floods, tsunamis, etc.), AMBER alerts, imminent threat alerts, presidential messages, etc. Such emergency alert systems may utilize a variety of communication techniques, including wireless communication techniques, to distribute such notifications. As one example, in the United States, the Emergency Alert System (EAS) includes the commercial mobile alert system (CMAS) and wireless emergency alert (WEA) standard. According to these systems, cellular broadcast techniques such as short message service—cellular broadcast (SMS-CB) may be deployed to distribute emergency alert messages to cellular devices in targeted geographical areas.

As noted above, some devices that include a cellular modem may have the cellular modem temporarily disabled, for example in order to save energy, or the device may be out of cellular coverage range. In such a case, the device may not be aware that a message (e.g., a CMAS alert) has been distributed via cellular broadcast. Because such alerts may commonly include time-critical content (e.g., notifications of imminent severe weather events), significant negative consequences (e.g., injury, death, property damage, etc.) may result from failed or even delayed delivery of such alerts to users. Furthermore, devices with a cellular modem may be required (e.g., by regulation) to be capable of receiving emergency alerts. Accordingly, improvements in wireless devices and wireless communication techniques would be desirable.

SUMMARY

In light of the foregoing and other concerns, it would be desirable to provide a way for a wireless user equipment (UE) device with cellular communication capability to receive indications that an emergency alert has been broadcast when the cellular modem of the UE has been temporarily disabled.

Accordingly, embodiments are presented herein of a method for a wireless UE device to receive indications of an emergency alert via Wi-Fi. The UE may include one or more radios (e.g., including at least a cellular radio), including one or more antennas, for performing wireless communications. The UE device may also include a cellular modem. The UE device may also include a processing element configured to implement part or all of the method (e.g., by executing program instructions). In addition, the UE device may include a non-transitory computer accessible memory medium, which may store program instructions executable by the UE.

According to some embodiments, the wireless UE device may, during registration of the wireless UE device with a cellular network, provide an indication of support for receiving indications of emergency alerts via Wi-Fi. The wireless UE device may, in response to receiving an indication of an emergency alert over a Wi-Fi network, activate the cellular modem of the wireless UE device. The wireless UE device may then retrieve the emergency alert via the cellular modem over the cellular network.

BRIEF DESCRIPTION OF THE DRAWINGS

A better understanding of the present subject matter can be obtained when the following detailed description of the preferred embodiment is considered in conjunction with the following drawings, in which:

FIG. 7 illustrates an example paging message related to existing cellular CMAS procedure in LTE, according to some embodiments;

Figure 1:
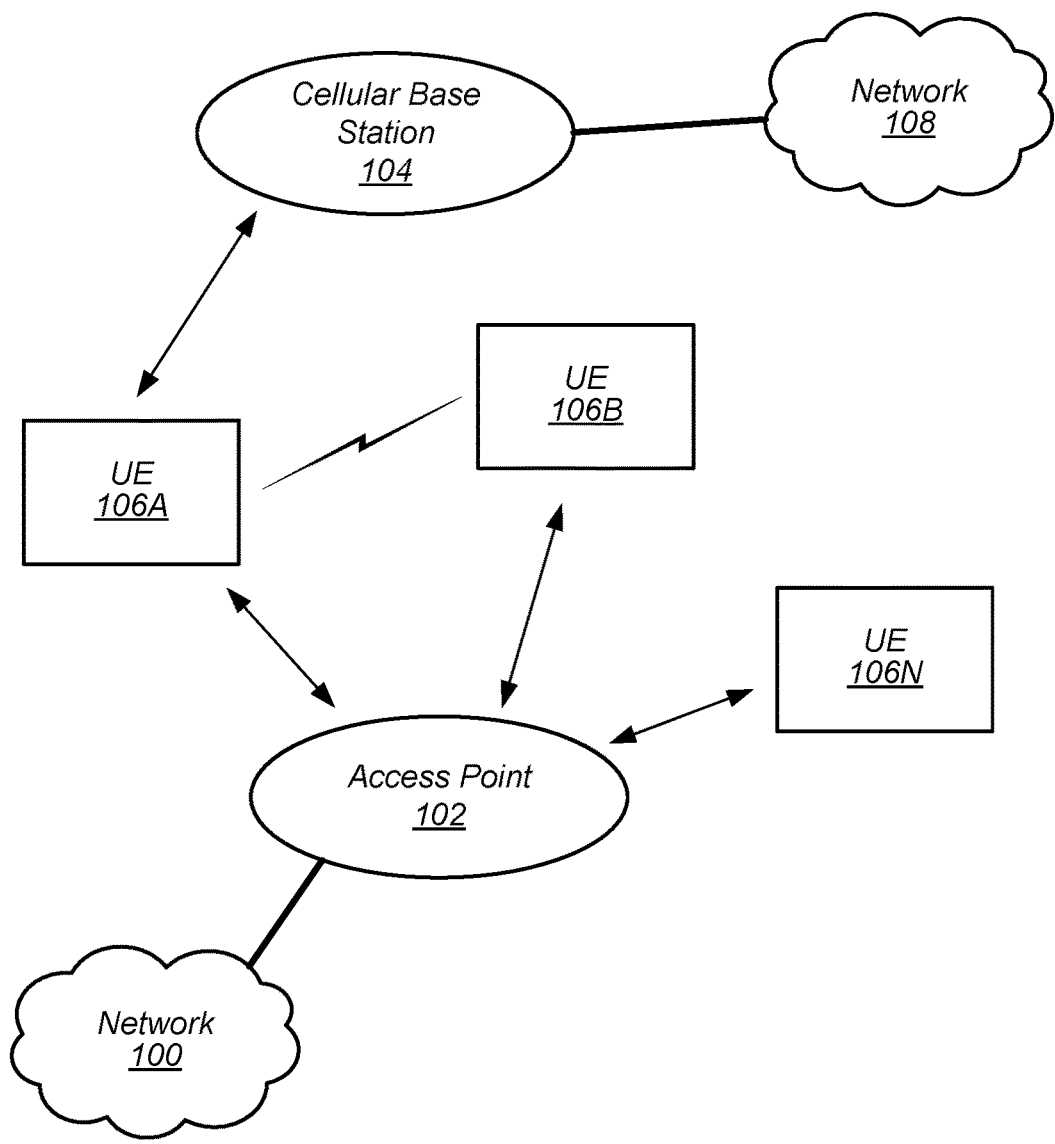
FIG. 1 illustrates an exemplary (and simplified) wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that is mobile or portable and that performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Accessory Device—any of various types of computer systems devices, including UE devices, that has cellular and/or WLAN communication capability and that communicates with a companion device. An accessory device may communicate with a cellular network directly (e.g., via a cellular communication capability, such as a cellular modem or a cellular radio) and/or indirectly (e.g., via a companion device). An accessory device may include cellular and/or WLAN communication capability (e.g., hardware configurable to communicate with a cellular or local wireless network), yet may temporarily disable (e.g., power down) the cellular and/or WLAN communication capability (e.g., in order to reduce power consumption). Thus, the term "accessory device" refers to any of various types of devices that in some instances have limited or reduced communication and/or power capabilities. Note that the limited or reduced communication and/or power capabilities may be due to hardware restrictions and/or limitations and/or may be due to the accessory device operating in a lower power state (e.g., by disabling one or more communication and/or power capabilities).

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, wherein the user provides input to directly perform the operation. An automatic procedure may be initiated by input provided by the user, but the subsequent actions that are performed "automatically" are not specified by the user, i.e., are not performed "manually," wherein the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
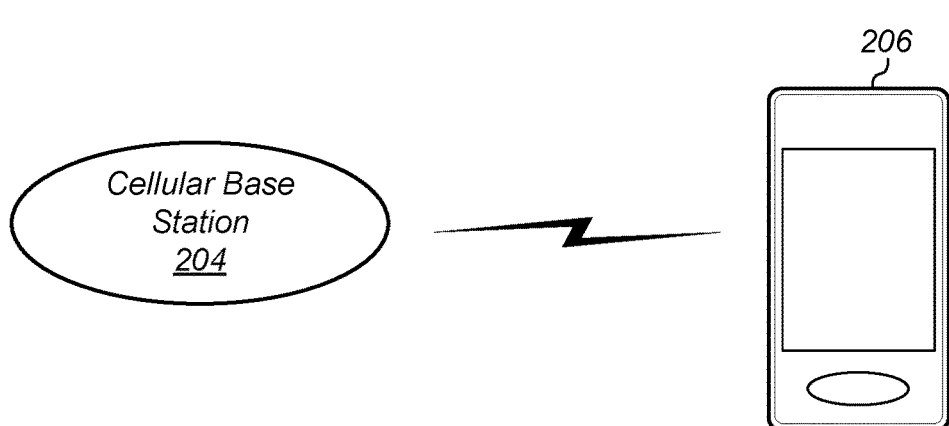
FIG. 2 illustrates a base station (BS) in communication with a user equipment (UE) device, according to some embodiments.

FIGS. 1-2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106-1 through 106-N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

As shown, multiple UEs 106 (e.g., UE 106A and UE 106B) may also be configured to communicate directly with each other, e.g., using a peer-to-peer wireless communication protocol. For example, Bluetooth ("BT," including BT low energy ("BLE"), Alternate MAC/PHY ("AMP"), and/or other BT versions or features), Wi-Fi ad-hoc/peer-to-peer, and/or any other peer-to-peer wireless communication protocol may be used to facilitate direct communications between two UEs 106.

In addition, at least one UE 106 (e.g., UE 106A) may be configured to communicate with a cellular base station 104. The base station 104 may be a base transceiver station (BTS) or cell site (a "cellular base station"), and may include hardware that enables wireless communication with UEs 106 according to one or more cellular communication protocols. The UE 106 and the cellular base station 104 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

As shown, the cellular base station may be equipped to communicate with a network 108 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 108. In particular, the cellular base station 104 may provide UEs 106 with various telecommunication capabilities, such as voice and SMS services (e.g., typically via circuit-switched wireless links) and/or data services (e.g., typically via packet-switched wireless links). In particular, the cellular base station 104 may provide cellular broadcast services (e.g., via SMS-Cellular Broadcast or SMS-CB) to UEs 106, which may be used to distribute emergency alert messages among various possibilities.

A UE 106 may be capable of communicating using multiple wireless communication standards. For example, the UE 106 may be configured to communicate using at least one wireless networking (e.g., Wi-Fi) and/or peer-to-peer wireless communication protocol (e.g., BT, Wi-Fi peer-to-peer, etc.) and at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 206 (e.g., UE device 106A illustrated in FIG. 1) in communication with the cellular base station 204, according to some embodiments. The UE 206 may be a device with wireless network connectivity such as a mobile phone, a hand-held device, a computer or a tablet, an accessory device, or virtually any type of wireless device.

The UE 206 may include a processor that is configured to execute program instructions stored in memory. The UE 206 may perform any of the methods embodiments described herein by executing such stored instructions. Alternatively, or in addition, the UE 206 may include a programmable hardware element such as an FPGA (field-programmable gate array) that is configured to perform any of the method embodiments described herein, or any portion of any of the method embodiments described herein.

The UE 206 may be configured to communicate using any of multiple wireless communication protocols. For example, the UE 206 may be configured to communicate using two or more of CDMA2000, LTE, LTE-A, Wi-Fi, or GNSS. Other combinations of wireless communication standards are also possible.

The UE 206 may include one or more antennas for communicating using one or more wireless communication protocols. The UE 206 may share one or more parts of a receive and/or transmit chain between multiple wireless communication standards; for example, the UE 206 might be configured to communicate using either of CDMA2000 (1×RTT/1×EV-DO/HRPD/eHRPD) or LTE using partiallly or entirely shared wireless communication circuitry (e.g., using a shared radio or at least shared radio components). The shared communication circuitry may include a single antenna, or may include multiple antennas (e.g., for MIMO)

for performing wireless communications. Alternatively, the UE 206 may include separate transmit and/or receive chains (e.g., including separate antennas and other radio components) for each wireless communication protocol with which it is configured to communicate. As a further possibility, the UE 206 may include one or more radios or radio components which are shared between multiple wireless communication protocols, and one or more radios or radio components which are used exclusively by a single wireless communication protocol. For example, the UE 206 might include a shared radio for communicating using either of LTE or CDMA2000 1×RTT, and separate radios for communicating using each of Wi-Fi and Bluetooth. Other configurations are also possible. The UE 206 may be configured to disable (e.g., to power down) the one or more radios and/or one or more radio components, for example to limit power consumption (such as during times of low device use).

Figure 3:
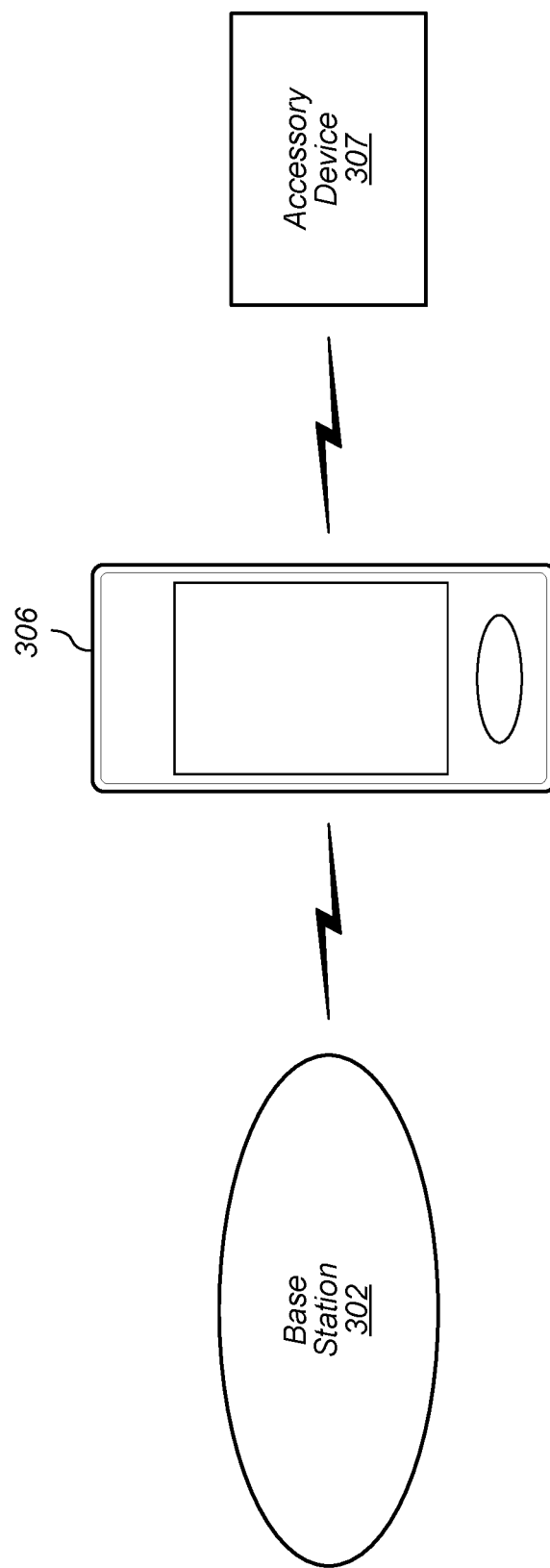
FIG. 3 illustrates a BS communicating with an accessory device through an intermediate companion device, according to some embodiments.

FIG. 3—Companion Device

FIG. 3 illustrates an example UE device 306 (e.g., one of the devices 106A through 106N) in communication with base station 302, according to some embodiments. The UE device 306 may have cellular and/or WLAN communication capability, and as described above, may be a device such as a mobile phone, a hand-held device, a media player, a computer, a laptop or a tablet, or virtually any type of wireless device. As shown, the UE 306 may also be in communication with accessory device 307, which may also be a UE device. Thus the UE 106 may operate as a companion device to the accessory UE device 307.

The UE device 306 and accessory device 307 may include a processing element, such as a processor that is configured to execute program instructions stored in memory. The UE device 306 and accessory device 307 may perform any of the method embodiments described herein by executing such stored instructions. Alternatively, or in addition, the processing element in the UE device 306 and accessory device 307 may include a programmable hardware element such as an FPGA (field-programmable gate array), or other circuitry, such as an ASIC, that is configured to perform any of the method embodiments described herein, or any portion of any of the method embodiments described herein. The UE device 306 and accessory device 307 may include one or more antennas for communicating using one or more wireless communication protocols or technologies.

The accessory device 307 may be any of various types of devices that may have full or limited communication capabilities. The accessory device 307 may have short range wireless communication capabilities such as Bluetooth and/or NFC, and/or medium range wireless communication capabilities, such as Wi-Fi, and may also include cellular communication capabilities.

In some embodiments, the accessory device 307 may be a smart watch or other type of wearable device. As another example, the accessory device 307 may be a tablet device, such as an iPad, with Wi-Fi capabilities (and possibly no cellular communication capabilities) which is not currently near a Wi-Fi hotspot and hence is not currently able to communicate over Wi-Fi with the Internet. Thus, the term "accessory device" refers to any of various types of devices that in some instances have limited or reduced communication and/or power capabilities and hence may opportunistically utilize the UE 306 as a proxy for communication purposes for one or more applications and/or RATs. When the UE 306 is used by the accessory device 307 as a proxy, the UE 306 may be referred to as a companion device to the accessory device 307.

Figure 4:
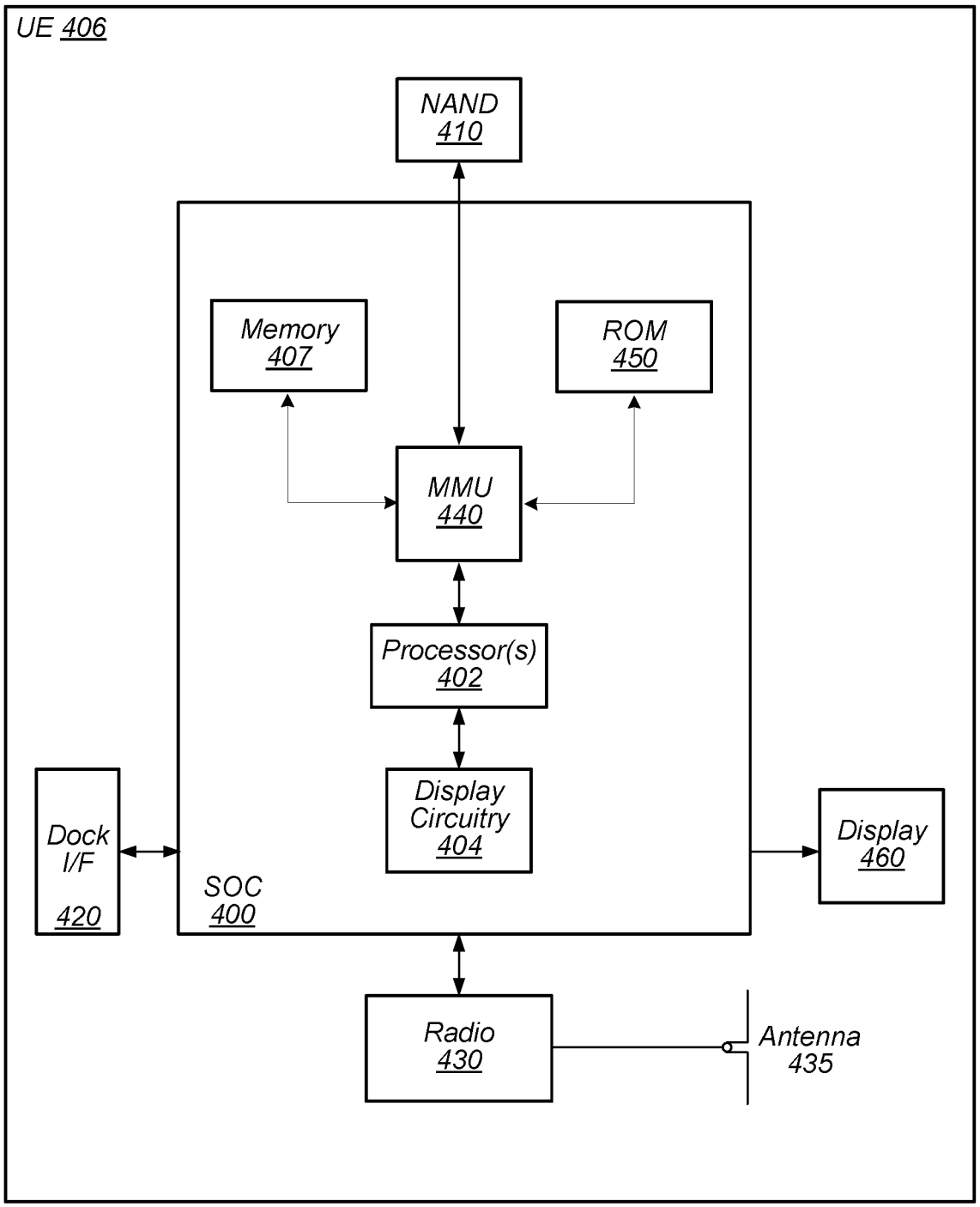
FIG. 4 illustrates an exemplary block diagram of a UE device, according to some embodiments.

FIG. 4—Exemplary Block Diagram of a UE

FIG. 4 illustrates an exemplary block diagram of a UE 406, according to some embodiments. Note that UE 406 may be an accessory device, such as accessory device 307, shown in FIG. 3. As shown, the UE 406 may include a system on chip (SOC) 400, which may include portions for various purposes. For example, as shown, the SOC 400 may include processor(s) 402 which may execute program instructions for the UE 406 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 407, read only memory (ROM) 450, NAND flash memory 410) and/or to other circuits or devices, such as the display circuitry 404, wireless communication circuitry 430 (also referred to as a "radio"), connector I/F 420, and/or display 460. The MMU 440 may be configured to perform memory protection and page table translation or set up. In some embodiments, the MMU 440 may be included as a portion of the processor(s) 402.

As shown, the SOC 400 may be coupled to various other circuits of the UE 406. For example, the UE 406 may include various types of memory (e.g., including NAND flash 410), a connector interface 420 (e.g., for coupling to a computer system, dock, charging station, etc.), the display 460, and wireless communication circuitry (or "radio") 430 (e.g., for LTE, LTE-A, CDMA2000, Bluetooth, Wi-Fi, GPS, etc.).

As noted above, the UE 406 may be configured to communicate wirelessly using multiple wireless communication standards. As further noted above, in such instances, the wireless communication circuitry (radio(s)) 430 may include radio components which are shared between multiple wireless communication standards and/or radio components which are configured exclusively for use according to a single wireless communication standard. As shown, the UE device 406 may include at least one antenna (and possibly multiple antennas, e.g., for MIMO and/or for implementing different wireless communication technologies, among various possibilities), for performing wireless communication with base stations, access points, and/or other devices. For example, the UE device 406 may use antenna 435 to perform the wireless communication.

The UE 406 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 406 may include hardware and software components for implementing features for distributing indications of emergency broadcast messages. The processor 402 of the UE device 406 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 406, in conjunction with one or more of the other components 400, 404, 407, 410, 420, 430, 435, 440, 450, 460 may be configured to implement part or all of the features described herein, such as the features described below.

Figure 5:
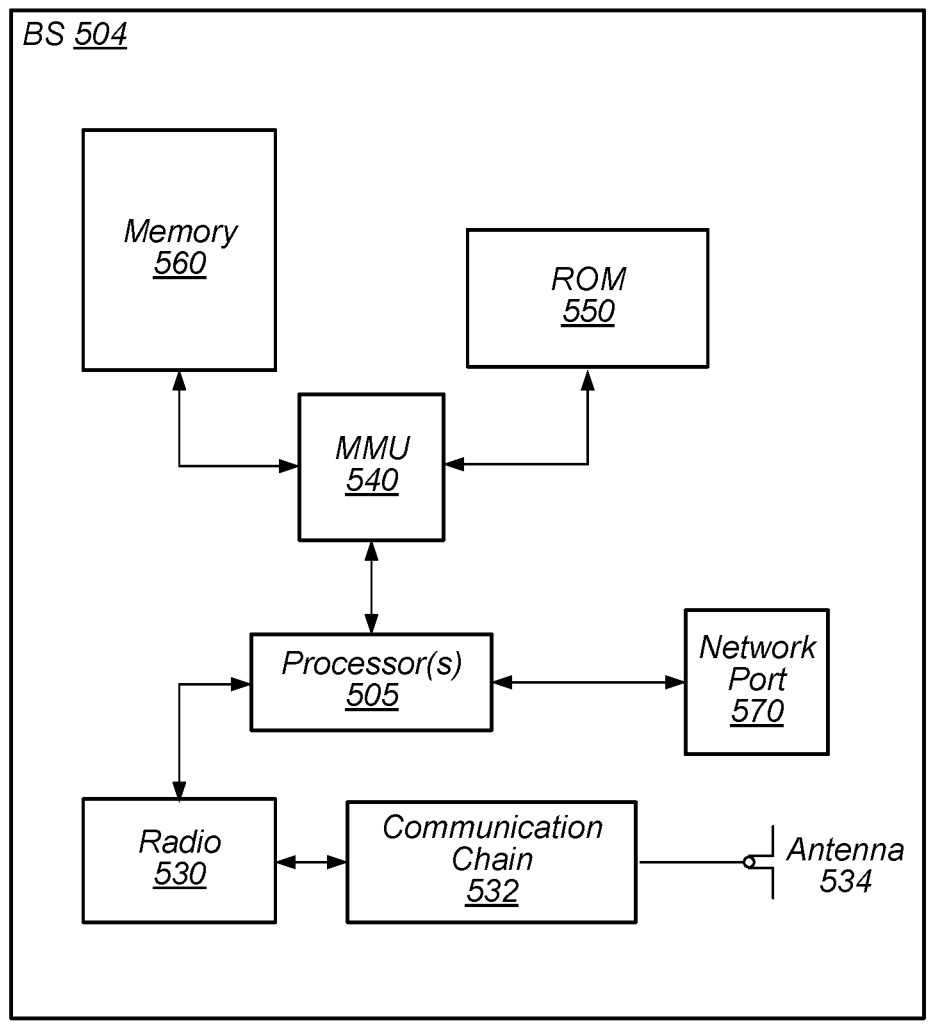
FIG. 5 illustrates an exemplary block diagram of a BS, according to some embodiments.

FIG. 5—Exemplary Block Diagram of a Base Station

FIG. 5 illustrates an exemplary block diagram of a cellular base station (BS) 504, according to some embodiments. It is noted that the base station of FIG. 5 is merely one example of a possible base station. As shown, the base station 504 may include processor(s) 505 which may execute program instructions for the base station 504. The processor(s) 505 may also be coupled to memory management unit (MMU) 540, which may be configured to receive addresses from the processor(s) 505 and translate those addresses to locations in memory (e.g., memory 560 and read only memory (ROM) 550) or to other circuits or devices.

The base station 504 may include at least one network port 570. The network port 570 may be configured to couple to a telephone network and provide a plurality of devices, such as UE devices 106, access to the telephone network as described above in reference to FIG. 1.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider). The base station 504 may also be coupled to an Emergency Alert System (EAS) via the network port 570, by which means the base station may receive emergency alert messages to distribute to cellular devices via cellular broadcast.

The base station 104 may include at least one antenna 534, and possibly multiple antennas. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless telecommunication standards, including, but not limited to, LTE, WCDMA, CDMA2000, etc.

The base station 504 may be configured to support provision by a UE 106 of messages received via cellular broadcast to other devices (e.g., devices without native cellular communication capabilities). In particular, as described further subsequently herein, the BS 504 may include hardware and software components for implementing (or for use in conjunction with a UE 106 implementing) part or all of a method for a UE 106 to provide indications of messages received by the UE 106 by way of cellular broadcast techniques to another device.

The processor 505 of the base station 504 may be configured to implement part or all of the methods described herein, e.g., by executing program instructions stored on a memory medium (e.g., a non-transitory computer-readable memory medium). Alternatively, the processor 505 may be configured as a programmable hardware element, such as an FPGA (Field Programmable Gate Array), or as an ASIC (Application Specific Integrated Circuit), or a combination thereof.

FIGS. 6-16—Distributing Indications of Emergency Alert Messages

Currently, a primary technique for distributing emergency alert messages includes the use of cellular broadcast messages. For example, an entity such as the Federal Emergency Management Agency (FEMA) in the United States, and similar entities in other countries, may be authorized to generate and distribute emergency alert messages to wireless carriers (e.g., cellular service providers), which may in turn distribute those emergency alert messages to cellular-capable devices that monitor compatible cellular broadcast channels via cellular broadcast techniques. An example of a cellular broadcast technique is the short message service-cellular broadcast (SMS-CB) format. An emergency alert SMS-CB message may include a text portion, and may include and/or cause a cellular device to use a ring tone and/or vibration (e.g., a unique ring tone and/or vibration) to alert a user of the message. In some cases, an SMS-CB transmission may be limited in length, though generally multiple SMS-CB transmissions may be used (e.g., SMS-CB messages may be concatenated) to effectively transmit a longer emergency alert message if need be.

A device with a cellular modem that would otherwise be capable of receiving an emergency alert message may have the cellular modem temporarily disabled, for example to conserve energy. For example, such a device may be a UE device and/or an accessory device, as described above. However, the time-sensitive nature of emergency alerts in particular increases the importance of such a device being able to receive these alerts in a timely manner. Furthermore, because these devices carry a cellular modem, some regulations may require these devices to be able to receive emergency alerts.

Accordingly, for devices with a cellular modem that is temporarily disabled, it would be desirable to provide techniques for providing indications to those devices that an emergency alert has been broadcast.

Figure 6:
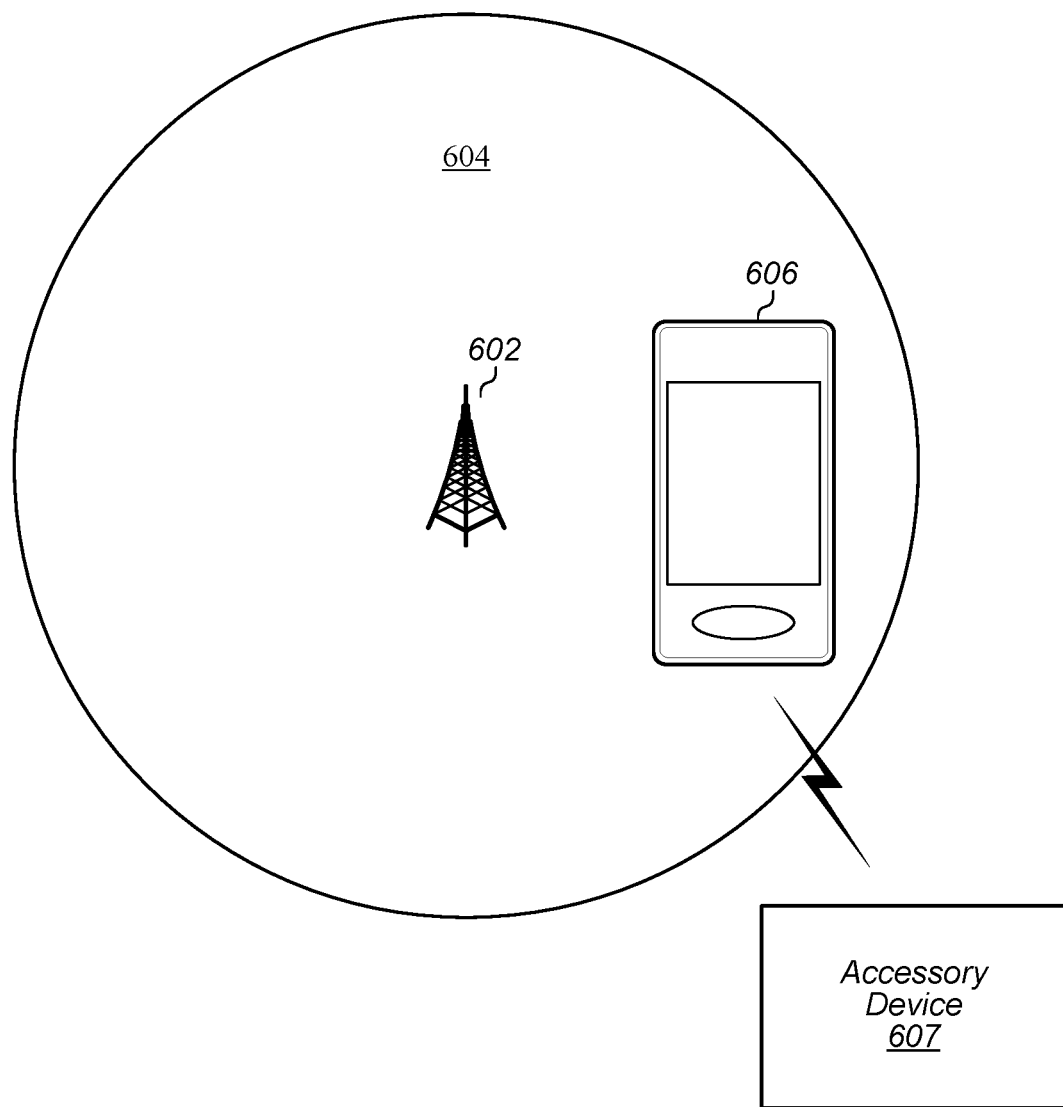
FIG. 6 illustrates an example diagram of communication between a companion device and an accessory device, according to some embodiments.

In reference to FIG. 6, some embodiments of the present disclosure relate to a companion device, such as companion device 606, detecting broadcast of an emergency message and the companion device 606 informing an accessory UE device 607 (e.g., a UE device with a cellular modem temporarily disabled) of the broadcast. In some embodiments, companion device 606 may have cellular coverage within cellular network 604. When an emergency message is broadcast via cellular network 604 (e.g., via base station 602), the companion device 606 may receive an indication of the emergency message such that the companion device 606 knows to retrieve the message. In some embodiments, the companion device 606 may, subsequent to receiving the indication of the emergency message, inform the accessory UE device 607 of the existence of an emergency message. The companion device 606 may inform the accessory UE device 607 of the existence of an emergency message by one or more various communication protocols (e.g., via Wi-Fi, Bluetooth, and/or any other peer-to-peer wireless communication protocol).

According to some embodiments, the companion device 606 may inform the accessory UE device 607 of the existence of the emergency message in a manner transparent to the user. That is, a user of the companion device 606 and/or a user of the accessory UE device 607 may be unaware that the companion device 606 has informed the accessory UE device 607 as to the existence of the emergency message.

After the accessory UE device 607 has been informed by the companion device 606, the accessory UE device 607 may activate a baseband layer (e.g., may activate a cellular modem and/or a cellular radio) and may search for the emergency message via the cellular network 604. In other words, in response to an indication by the companion device 606, the accessory UE device 607 may activate the cellular modem (e.g., enable the cellular modem) in order to retrieve the emergency message. The accessory UE device 607 may be configured for wireless communication according to one or more cellular communication protocols (e.g., UMTS, LTE, and/or CDMA2000, among various possibilities) and may communicate with the cellular network 604 according to one or more of these protocols. In this way, the accessory UE device 607 may achieve the benefits of temporarily disabling the cellular modem while also maintaining the capability of receiving emergency messages.

Some embodiments of the present disclosure relate to informing the accessory UE device 607 of the existence of an emergency message via crowd sourcing (e.g., via iCloud™). According to some embodiments, a companion device 606 of the accessory UE device 607 may not receive an indication of an emergency message. For example, the companion device 606 may be outside of the coverage area for the emergency message (e.g., may be outside of coverage of network 604). According to some embodiments, the companion device 606 may not be activated (e.g., may be powered off) and/or may have the cellular radio temporarily disabled and/or otherwise inoperable.

According to some embodiments, other cellular devices in the vicinity of the accessory UE device 607 (e.g., devices on the same wireless network, devices within range of communication via a peer-to-peer wireless communication protocol, etc.) may receive an indication of an emergency message. One or more of these devices (e.g., a device that has received an indication of the emergency message) may inform the accessory UE device 607 that an emergency message has been broadcast. In response to receiving this indication, the accessory UE device 607 may activate the baseband layer in order to retrieve the emergency message from the network (e.g., from a base station, such as an eNB). In some embodiments, the device that informs the accessory UE device 607 may be known, trusted, and/or verified so as to convey the emergency message (as opposed to an indication of the message) directly to the accessory UE device 607. In such a scenario, the accessory UE device 607 does not need to activate the cellular modem in order to retrieve the emergency message because the accessory UE device 607 has already received the emergency message.

FIG. 7 illustrates an example paging message related to existing cellular CMAS procedure in LTE, according to some embodiments. As illustrated, if the CMAS indication is included in the paging message while the UE is in idle mode or connected mode, the UE may reacquire the System Information Block (SIB) Type 1 immediately or substantially immediately (i.e., without waiting until the next system information modification period). If the scheduling info list in SIB 1 indicates that a SIB Type 12 is present, then the UE may acquire the SIB Type 12.

Figure 8:
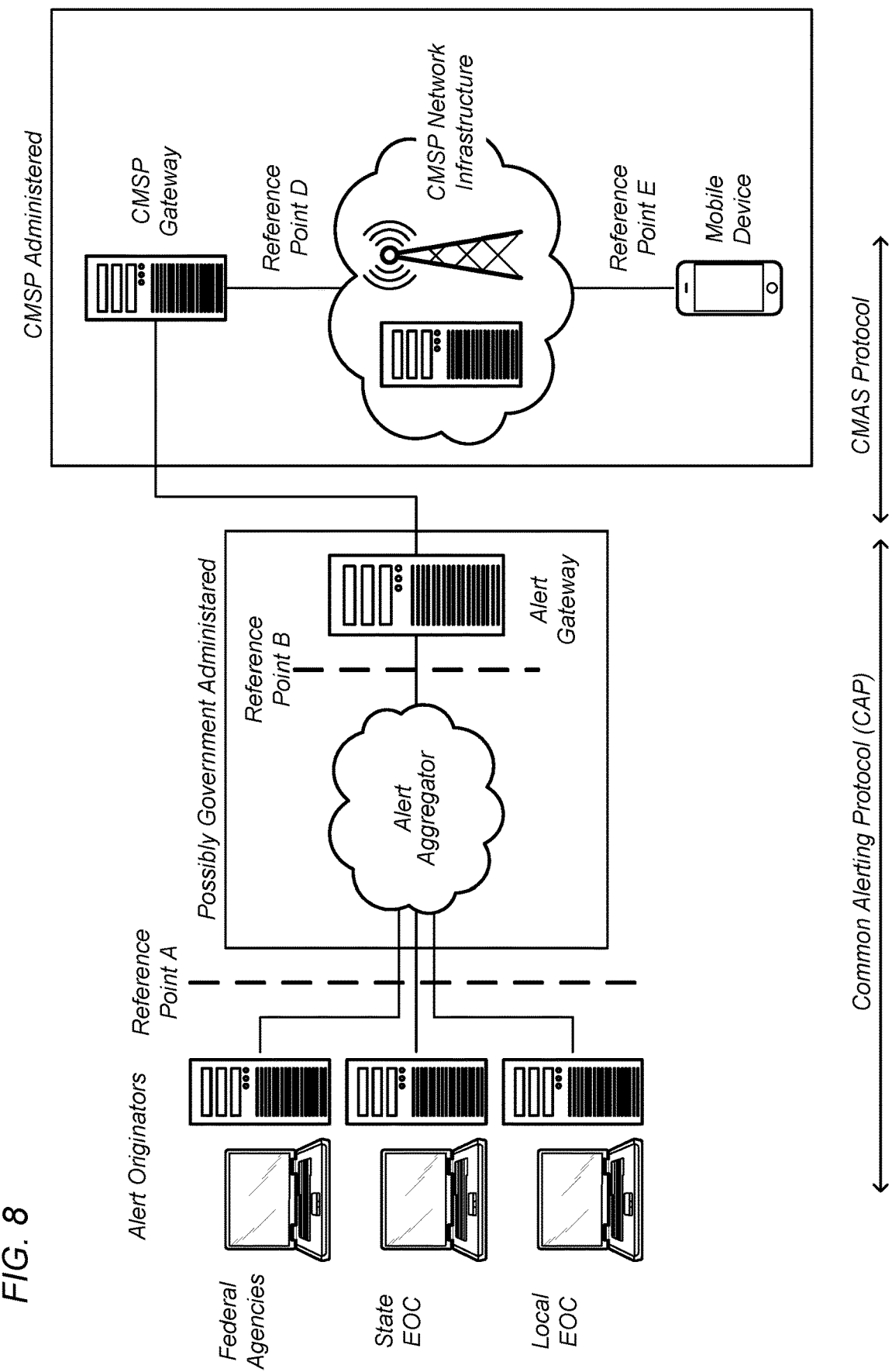
FIG. 8 illustrates existing commercial mobile alert system (CMAS) architecture, according to some embodiments.

FIG. 8 illustrates existing CMAS architecture, according to some embodiments. Alert originators comprise a group of entities that generate emergency alerts. These entities include federal agencies and state and local emergency operations centers (EOCs). Generates alerts may be collected at an alert aggregator, which may or may not be government administered. Aggregated alerts pass through an alert gateway to a commercial mobile service provider (CMSP) administered system configured to distribute emergency alerts. Aggregated alerts pass through a CMSP gateway and, via a CMSP network infrastructure, may be distributed to various mobile devices served by the CMSP.

Figure 9:
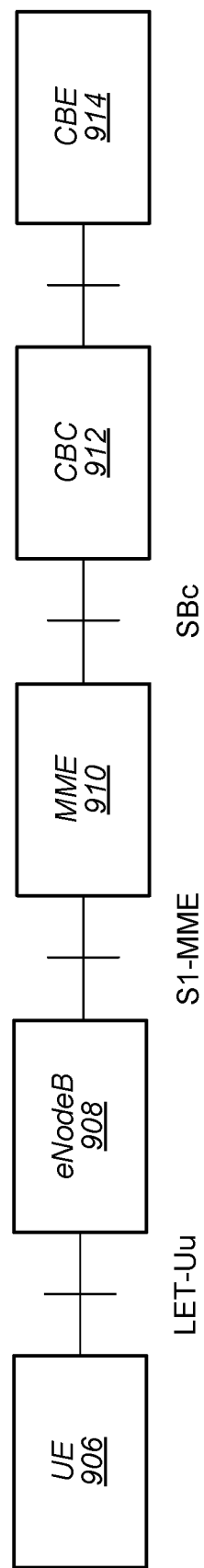
FIG. 9 illustrates cell broadcast service (CBS) architecture, according to some embodiments.

FIG. 9 illustrates cell broadcast service (CBS) architecture, according to some embodiments. A CMAS capable UE 906 uses the CBS procedures specified in technical specification (TS) 23.041. CBS messages may originate from a number of cell broadcast entities (CBEs), such as CBE 914, which are connected to a cell broadcast center (CBC), such as CBC 912. CBS messages are then sent from the CBC 912 to the cells, in accordance with the CBS's coverage requirements. The CBC 912 is part of the core network and is connected to one or more mobility management entities (MMEs), such as MME 910, via the SBc reference point. The interface between the CBC 912 and the MME 910 is described in 3gPP TS 29.168 and the interface between the MME 910 and the eNodeB (eNB) 908 is described in TS 36.413.

Figure 10:
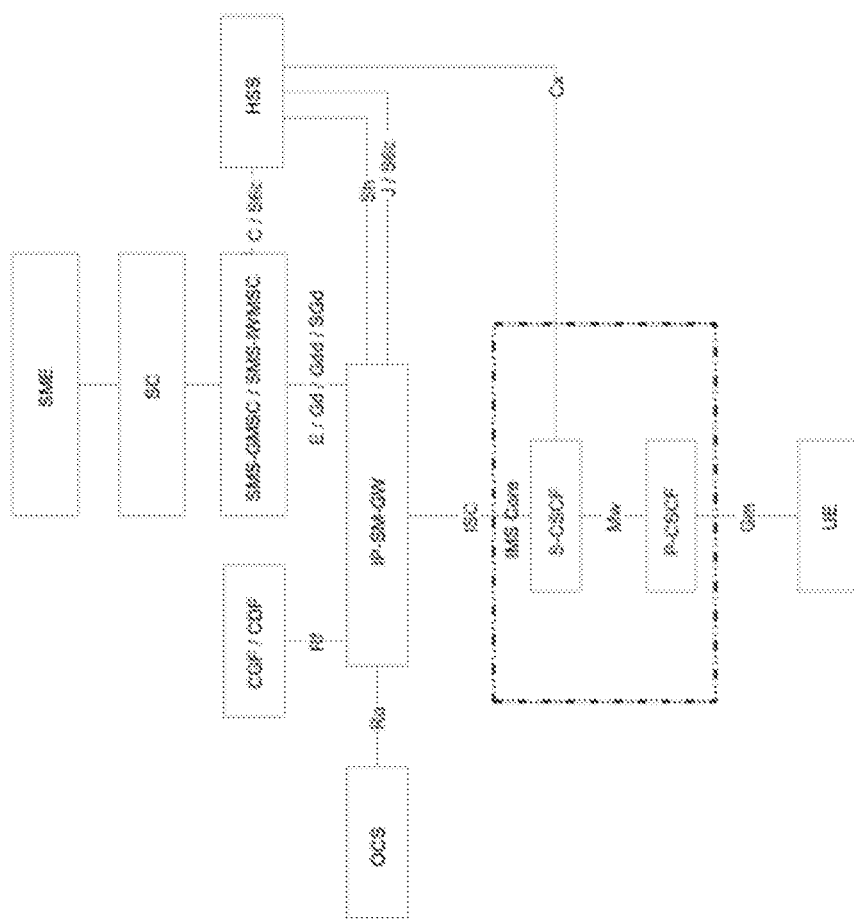
FIG. 10 illustrates a short message service (SMS) over internet protocol (IP) multimedia subsystem (IMS) architecture, according to some embodiments.

FIG. 10 illustrates an SMS over IMS architecture, according to some embodiments. SMS over IP functionality provides the UE with the capability of sending traditional short messages over the IMS network. An example architecture for SMS is specified in 3GPP TS 23.040 and for SMS over IP functionality in 3GPP TS 23.204. UE support is specified in GSM PRD IR.51 and GMA PRD IR.92. If the UE supports SMS over IP, it may include a feature tag used to indicate SMS over IP service, that being +g.3gpp.smsip as defined in section 5.3.2.2 of 3GPP TS 24.341. On sending a REGISTER request, the SM-over-IP receiver indicates its capability to receive traditional short messages over IMS network by including a "+g.3gpp.smsip" parameter into the Contact header according to RFC 3840.

Figure 11:
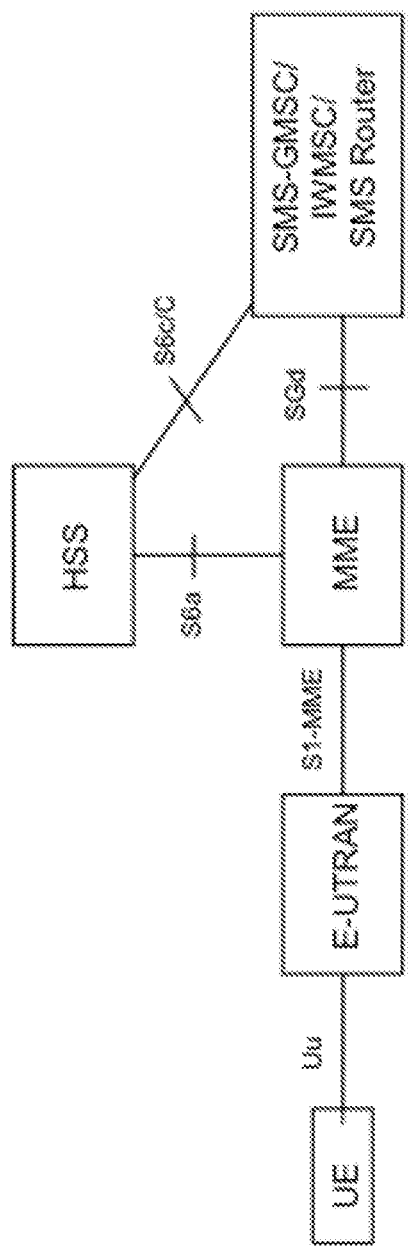
FIG. 11 illustrates SMS in mobile management entity (MME) architecture, according to some embodiments.
Figure 12:
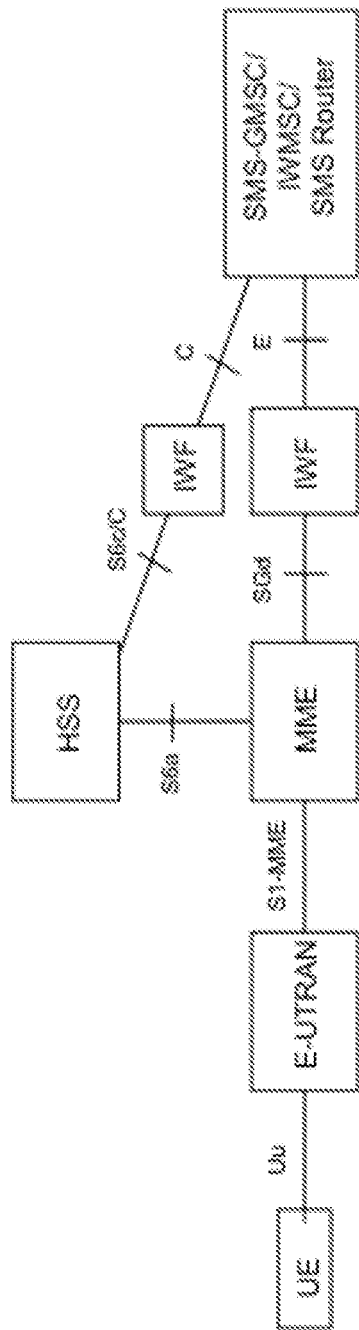
FIG. 12 illustrates SMS in an MME architecture, according to some embodiments.

FIGS. 11 and 12 illustrate SMS in MME architecture, according to some embodiments. The architecture is specified in TS 23.272 and the Diameter procedures over the SGd interface are specified in TS 29.338. This architecture is designed to deliver SMS services over EPS NAS signaling for UEs requiring SMS services. "SMS in MME" can interconnect with SMS in IMS using the SGd interface. That is, the E/Gd/Gdd/SGd interface allows the IP-SM-GW to connect to the SMS-GMSC, appearing to the SMS-GMSC as an MSC, SGSN, or MME. For interworking with SMS in MME as defined in TS 23.272, Annex C, an IWF may be used as described in that clause.

Figure 13:
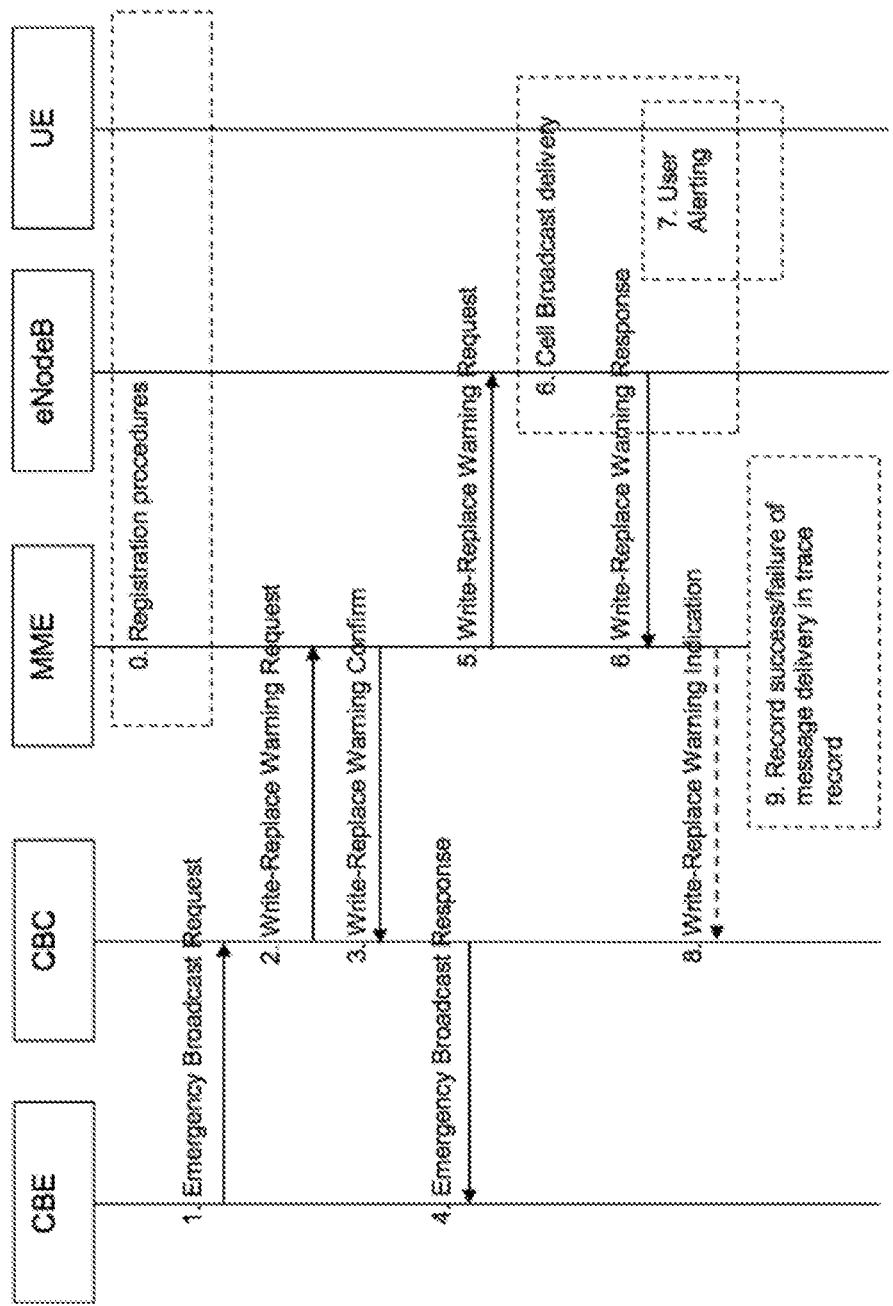
FIG. 13 illustrates an existing public warning system in E-UTRAN, according to some embodiments.

FIG. 13 illustrates a diagram of an existing public warning system in E-UTRAN, according to some embodiments. The warning message to be broadcast may be delivered via MMEs to multiple eNBs. The eNBs may be responsible for scheduling the broadcast of the new message and the repetitions in each cell. At step 0, network registration and security (e.g. mutual authentication) procedures may be performed. The UE may store a flag that indicates whether or not it has authenticated the network. This step may be performed each time a UE is attached to a network (e.g., after each power on).

At step 1, the CBE (e.g., Information Source such as PSAP or Regulator) may send emergency information (e.g., "warning type," "warning message," "impacted area," "time period") to the CBC. The CBC may authenticate this request.

At step 2, using the "impacted area" information, the CBC may identify which MMEs need to be contacted and may determine the information to be place into the Warning Area Information Element. The CBC may send a Write-Replace Warning Request message containing the warning message to be broadcast and the delivery attributes (Message identifier, Serial Number, Tracking Area ID list, Warning Area, OMC ID, CWM Indicator) to MMEs.

At step 3, the MME may send a Write-Replace Warning Confirm message that indicates to the CBC that the MME has started to distribute the warning message to eNodeBs. If this message is not received by the CBC within an appropriate time period, the CBC may attempt to deliver the warning message via another MME in the same pool area.

At step 4, upon reception of the Write-Replace Confirm messages from the MMEs, the CBC may confirm to the CBE that it has started to distribute the warning message.

At step 5, the MME may forward Write-Replace Warning Message Request to eNodeBs. The MME may use the Tracking Area ID list to determine the eNodeBs in the delivery area. If the Tracking Area ID list is empty, the message may be forwarded to all eNodeBs that are connected to the MME.

At step 6, the eNodeB may detect duplicate messages by checking the message identifier and serial number fields within the warning message. If any redundant messages are detected, only the first one received may be broadcasted by the cells. The eNodeB may use the Warning Area information to determine the cell(s) in which the message is to be broadcast. The eNodeBs may return a Distribute Warning Message Response to the MME, even if it was a duplicate.

At step 7, if the UE has been configured to receive warning messages and the UE has authenticated the core network of the eNodeB it is camped on, then the UE may proceed as follows:

1) The UE may use "warning type" values, 'earthquake,' 'tsunami' or 'earthquake and tsunami,' immediately to alert the user. When "warning type" is 'test,' the UE may silently discard the primary notification, but the UE specially designed for testing purposes may proceed with the following procedures.

2) The UE may activate reception of the broadcast messages containing the "warning message."

3) The UE may indicate the contents of the "warning message" to the user.

At step 8, from the Write-Replace Warning Response messages returned by eNodeBs, the MME may determine the success or failure of the delivery and creates a trace record. Any OMC ID received in step 2 may be written to the trace record to permit the O&M system to deliver them to the desired destination.

Figure 14:
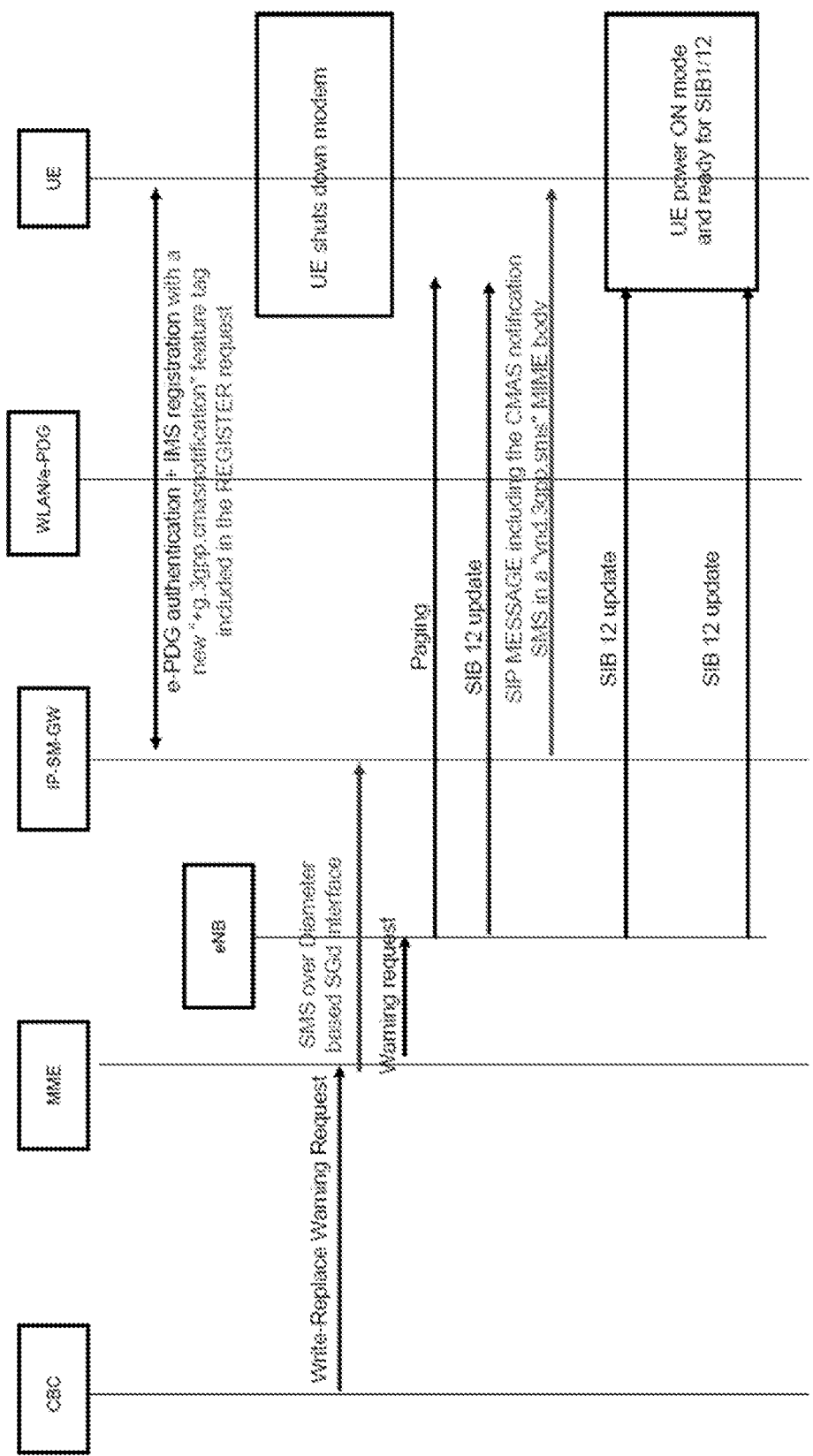
FIG. 14 illustrates delivery of an SMS notification over Wi-Fi, according to some embodiments.

FIG. 14 illustrates a proposed extension to deliver an SMS notification over Wi-Fi, according to some embodiments. Similar to step 0 described above, network registration and security procedures may be performed between the UE and the IP-SM-GW. In addition to e-PDG authentication and IMS registration, this step may further feature a new "+g.3gpp.cmasnotification" feature tag included in the REGISTER request. Note that the UE may shut down the cellular modem after this step has been performed.

Between steps 2 and 5 as describe above (that is, after the CBC sends a Write-Replace Warning Request message to the MME and before the MME forwards the Write-Replace Warning Message Request to eNodeBs), the MME may send an SMS over Diameter using the SGd interface, as described above. After the eNB has received the warning request from the MME, the eNB may attempt to page the UE and issue a SIB 12 update. However, as noted above, the UE may have disabled the cellular modem, and hence would be unable to receive the page and/or the SIB 12 update from the eNB. After the IP-SM-GW has received the SMS from the MME, the IP-SM-GW may issue a SIP MESSAGE including the CMAS notification via SMS in a "vnd.3gpp.sms" MIME body to the UE over Wi-Fi. In response, the UE may active its cellular modem (thereby enabling the UE to receive SIB 1/12 messages) and may retrieve the SIB 12 update from the eNB via the cellular network.

According to some embodiments, UEs may be filtered at the IP-SM-GW. The UE may indicate support for the "CMAS notification SMS" by including a new feature tag the "+g.3gpp.cmasnotification" feature tag described above) in the REGISTER request that can be sent along with the regular SMS feature tag. Thus, in sending the REGISTER request (which includes the "+g.3gpp.cmasnotification" and a "+g.3gpp.smsip" parameter into the Contact header according to RFC 3840), the UE may indicate its capability to receive "CMAS notification short messages" in addition to traditional short messages over the IMS network. Benefits of this procedure include the lack of any additional steps on the UE side and the regular IMS registration may be performed with the addition of a single additional parameter.

Figure 15:
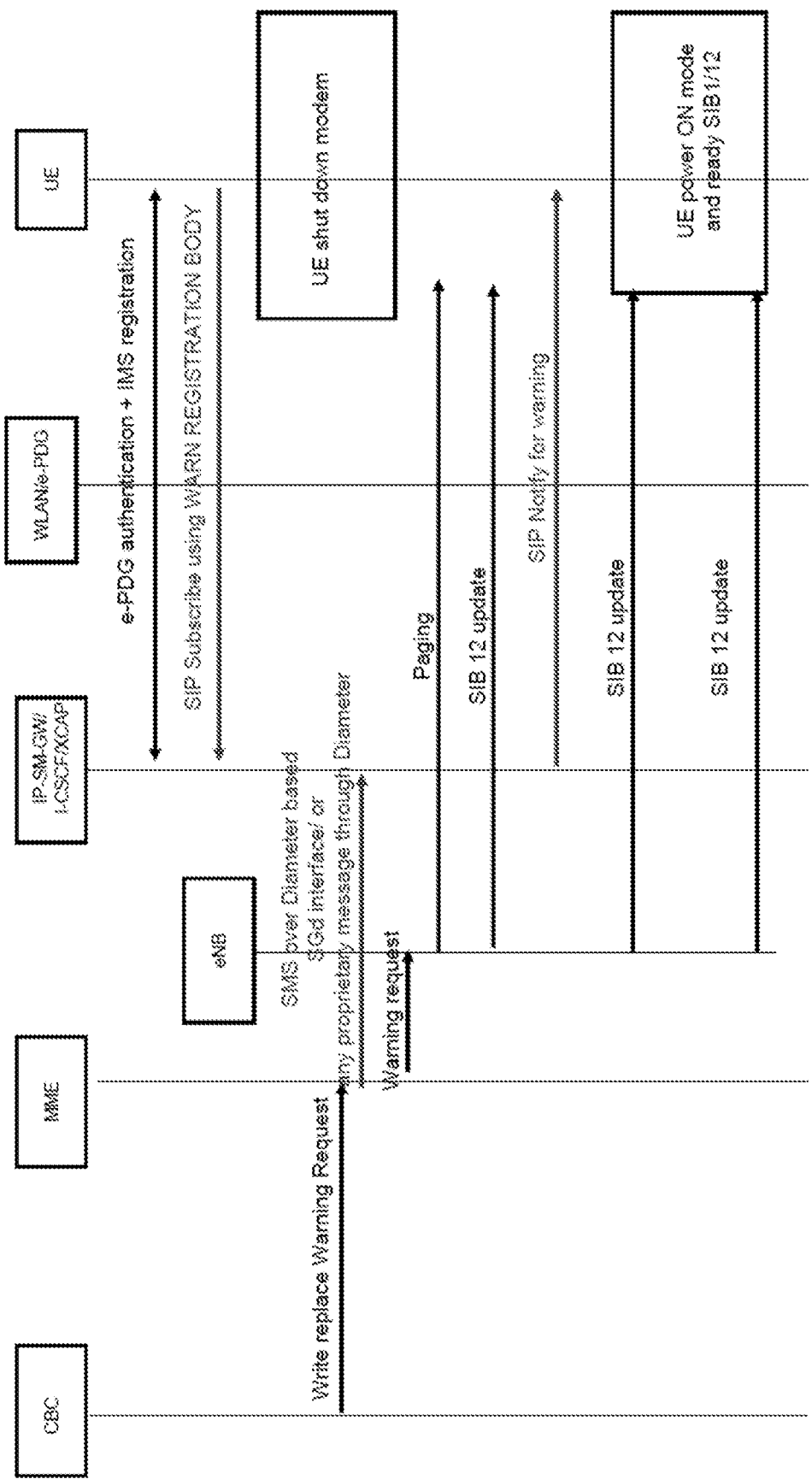
FIG. 15 illustrates an additional embodiment for alarm call flow, according to some embodiments.

FIG. 15 illustrates an additional embodiment of a proposed extension for alarm call flow, according to some embodiments. Instead of a UE registering on Wi-Fi indicating support for "CMAS notification SMS" (that is, the UE does not include the "+g.3gpp.cmasnotification" feature tag in the REGISTER request sent to the IP-SM-GW), the UE may send a SIP SUBSCRIBE request to an IMS Application Server/I-CSCF/IP-SM-GW for the "common-alerting protocol" Event Package with a <warning-registration> XML element included in the SUBSCRIBE request body. Note that the UE may shut down the cellular modem after this step has been performed.

After the MME receives the Write-Replace Warning Request from the CBC, the MME may send an SMS over Diameter using the SGd interface or any proprietary message through Diameter. After the eNB has received the warning request from the MME, the eNB may attempt to page the UE and issue a SIB 12 update. However, as noted above, the UE may have disabled the cellular modem, and hence would be unable to receive the page and/or the SIB 12 update from the eNB. After the IMS Application Server/I-CSCF/IP-SM-GW has received the SMS from the MME, the IP-SM-GW/I-CSCF/XCAP may issue a SIP NOTIFY request for warning the UE over Wi-Fi. In response, the UE may active its cellular modem (thereby enabling the UE to receive SIB 1/12 messages) and may retrieve the SIB 12 update from the eNB via the cellular network.

Figure 16:
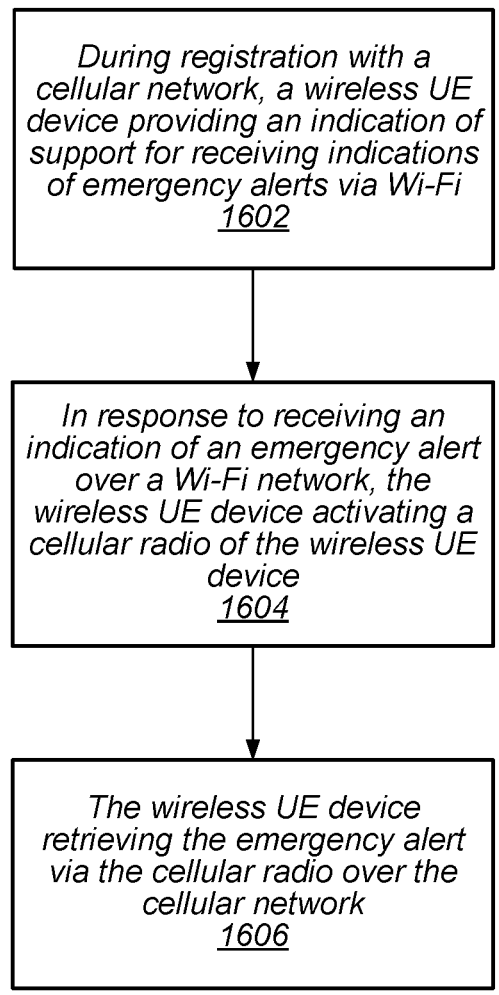
FIG. 16 illustrates an example of a method for distributing alerts over Wi-Fi, according to some embodiments.

FIG. 16 illustrates an example of a method for distributing alerts over Wi-Fi, according to some embodiments. At 1602, during registration with a cellular network, a wireless UE device provides an indication of support for receiving indications of emergency alerts via Wi-Fi. According to some embodiments, the indication of support for receiving indications of emergency alerts may be a feature tag included in a REGISTER request. For example, the indication of support may indicate support for a CMAS notification SMS feature. The UE may include an additional parameter during registration indicating support for receiving CMAS notifications. According to some embodiments, the indication for support may be a SIP Subscribe messaging using a WARN REGISTRATION BODY.

At 1604, in response to receiving an indication of an emergency alert over a Wi-Fi network, the wireless UE device activates a cellular radio of the wireless UE device. According to some embodiments, the indication of an emergency alert may include a SIP MESSAGE including a CMAS notification SMS. According to some embodiments, the indication of an emergency alert may include a SIP Notify message.

At 1606, the wireless UE device retrieves the emergency alert via the cellular radio over the cellular network. According to some embodiments, the emergency alert may be sent from a base station (e.g., an eNB) and may include a SIB 12 update.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising: a cellular radio, comprising one or more antennas configured for wireless communication; a cellular modem operably coupled to the cellular radio; and a processing element operably coupled to the cellular radio; wherein the cellular radio and the processing element are configured to: during registration with a cellular network, provide an indication of support for receiving indications of emergency alerts via Wi-Fi; turn off the cellular radio after registration with the cellular network and after providing the indication of support for receiving indications of emergency alerts via Wi-Fi; receive, over a Wi-Fi network, an indication of an emergency alert, wherein the indication of the emergency alert is received over the Wi-Fi network while the cellular radio is turned off; in response to receiving the indication of the emergency alert over the Wi-Fi network while the cellular radio is turned off, activate the cellular radio to retrieve the emergency alert over the cellular network; and retrieve a message via the cellular radio over the cellular network, wherein the message comprises the emergency alert.

2. The wireless UE device of claim 1, wherein the indication of support for receiving indications of emergency alerts via Wi-Fi comprises a feature tag in a REGISTER request sent from the wireless UE device to an IP-SM-GW.

3. The wireless UE device of claim 2, wherein the feature tag in the REGISTER request is an additional parameter indicating support for receiving a CMAS notification short message service (SMS).

4. The wireless UE device of claim 1, wherein the indication of an emergency alert over the Wi-Fi network comprises a SIP MESSAGE comprising a CMAS notification.

5. The wireless UE device of claim 1, wherein the indication of support for receiving indications of emergency alerts via Wi-Fi comprises a short message service (SMS) message.

6. The wireless UE device of claim 1, wherein the indication of the emergency alert is a SIP NOTIFY request and wherein the radio and the processing element are configured to turn on the cellular modem responsive to receiving the SIP NOTIFY request over Wi-Fi.

7. The wireless UE device of claim 1, wherein the indication of support for receiving indications of emergency alerts via Wi-Fi comprises a SIP Subscribe message.

8. A method of providing indications of emergency alerts over Wi-Fi, the method comprising a wireless user equipment (UE) device performing: during registration of the wireless UE device with a cellular network, providing an indication of support for receiving indications of emergency alerts via Wi-Fi; powering off a cellular radio of the wireless UE device after registration with the cellular network and after providing the indication of support for receiving indications of emergency alerts via Wi-Fi; receiving an indication of an emergency alert over a Wi-Fi network, wherein the indication is received over the Wi-Fi network while the cellular radio is powered off; in response to receiving an indication of the indication of the emergency alert over the Wi-Fi network while the cellular radio is powered off, activating the cellular radio of the wireless UE device to retrieve the emergency alert via the cellular network using the cellular radio; and retrieving the emergency alert via the cellular radio over the cellular network.

9. The method of claim 8, wherein the method further comprises the wireless UE device powering off the cellular radio after retrieving the emergency alert via the cellular radio over the cellular network.

10. The method of claim 9, wherein the method further comprises the wireless UE device triggering, responsive to retrieving the emergency alert, a notification indicating receipt of the emergency alert.

11. The method of claim 8, wherein the indication of support for receiving indications of emergency alerts via Wi-Fi includes a SIP Subscribe message.

12. The method of claim 8, wherein the indication of support for receiving indications of emergency alerts via Wi-Fi includes a feature tag included in a REGISTER request.

13. The method of claim 12, wherein the feature tag is appended to an IMS registration message sent by the wireless UE device to a gateway of the cellular network.

14. The method of claim 8, wherein the indication of support is provided to an an IP-SM-GW.

15. An apparatus comprising a processing element, the apparatus configured to cause a wireless user equipment (UE) device to: during registration of the wireless UE device with a cellular network, provide an indication of support for receiving indications of emergency alerts via Wi-Fi; power down a cellular radio of the wireless UE device after providing the indication of support and after registration with the cellular network; receive, over a Wi-Fi network, an indication of an emergency alert, wherein the indication of the emergency alert is received over the Wi-Fi network while the cellular radio is powered down; in response to receiving the indication of the emergency alert over the Wi-Fi network while the cellular radio is powered down, activate the cellular radio of the wireless UE device; and retrieve the emergency alert via the cellular radio over the cellular network.

16. The apparatus of claim 15, wherein the apparatus is further configured to cause the wireless UE device to power down the cellular radio after retrieving the emergency alert via the cellular radio over the cellular network.

17. The apparatus of claim 15, wherein the indication of the emergency alert is a SIP NOTIFY request and wherein the apparatus is further configured to cause the wireless UE device to turn on a cellular modem responsive to receiving the SIP NOTIFY request over Wi-Fi.

18. The apparatus of claim 15, wherein the indication of support for receiving indications of emergency alerts via Wi-Fi includes a SIP Subscribe message.

19. The apparatus of claim 15, wherein the indication of the emergency alert comprises a short message service (SMS) message.

* * * * *